US012134406B2

(12) United States Patent
Mikhailov et al.

(10) Patent No.: US 12,134,406 B2
(45) Date of Patent: Nov. 5, 2024

(54) SYSTEM AND METHOD FOR PROTECTING ELECTRONIC VEHICLE CONTROL SYSTEMS AGAINST HACKING

(71) Applicant: Reperion Pte. Ltd., Singapore (SG)

(72) Inventors: Dmitry Mikhailovich Mikhailov, Moscow (RU); Evgeny Valerievich Grudovich, Minsk (BY); Vladimir Ivanovich Rutsky, Minsk (BY); Alexandr Anatolievich Pesotsky, Minsk (BY); Vadim Olegovich Grabinsky, Moscow (RU); Alexey Sergeevich Pronichkin, Dimitrovgrad (RU)

(73) Assignee: Reperion Pte. Ltd., Singapore (SG)

( * ) Notice: Subject to any disclaimer, the term of this patent is extended or adjusted under 35 U.S.C. 154(b) by 313 days.

(21) Appl. No.: 17/440,651

(22) PCT Filed: Mar. 19, 2020

(86) PCT No.: PCT/RU2020/050051
§ 371 (c)(1),
(2) Date: Sep. 17, 2021

(87) PCT Pub. No.: WO2020/190178
PCT Pub. Date: Sep. 24, 2020

(65) Prior Publication Data
US 2022/0161828 A1 May 26, 2022

(30) Foreign Application Priority Data
Mar. 19, 2019 (RU) .................... RU2019107755

(51) Int. Cl.
*B60W 60/00* (2020.01)
*B60W 50/06* (2006.01)
*B60W 50/14* (2020.01)

(52) U.S. Cl.
CPC ...... *B60W 60/00188* (2020.02); *B60W 50/06* (2013.01); *B60W 50/14* (2013.01); *B60W 2050/146* (2013.01)

(58) Field of Classification Search
CPC .......... B60W 60/00188; B60W 50/06; B60W 50/14; B60W 2050/146; G06F 21/552;
(Continued)

(56) References Cited

U.S. PATENT DOCUMENTS 7,778,606 B2 * 8/2010 Ammon .............. H04L 63/1425
455/67.11
8,490,191 B2 * 7/2013 Kuegler .................. G06F 21/54
717/129
(Continued)

FOREIGN PATENT DOCUMENTS

RU        2 249 514        4/2005
RU      2249514 C1 *      4/2005
(Continued)

OTHER PUBLICATIONS

International Search Report for PCT/RU2020/050051 dated Sep. 10, 2020, 4 pages.
(Continued)

*Primary Examiner* — Peter D Nolan
*Assistant Examiner* — Peter Y Ning
(74) *Attorney, Agent, or Firm* — Nixon & Vanderhye PC

(57) ABSTRACT

Techniques for protecting electronic vehicles control systems from unauthorized intrusion work with at least one electronic module of the vehicle and a protection device connected via electrical conductors to the interface communication line. The protection device includes a control unit for monitoring and control of vehicle parameters, a passive scanning of interface communication lines unit, a spectral analysis of interface communication lines unit, a unit for
(Continued)

detection and suppression of malicious commands, and a unit for detecting and jamming in a given frequency range an unauthorized receiver/transmitter. The units for passive scanning of interface communication lines, spectral analysis, and detection and suppression of malicious commands are connected to the interface communication line. To detect unauthorized devices, the electrical parameters and the electrical signal of the interface communication line are measured, followed by construction of the signal spectrum in first and second time periods and their comparison.

18 Claims, 6 Drawing Sheets

(58) Field of Classification Search
CPC ... G06F 21/567; H04L 67/12; H04L 63/0227; H04L 63/1425; B60R 25/00
See application file for complete search history.

(56) References Cited

U.S. PATENT DOCUMENTS

| | | | | |
|---|---|---|---|---|
| 8,577,034 | B2 * | 11/2013 | Lehner | G06K 7/084 |
| | | | | 380/252 |
| 9,286,485 | B2 * | 3/2016 | Kotani | G06F 21/606 |
| 9,881,165 | B2 * | 1/2018 | Litichever | H04L 63/1425 |
| 10,757,113 | B2 * | 8/2020 | Bathurst | H04L 12/40032 |
| 11,190,533 | B2 * | 11/2021 | Tsurumi | H04L 63/1425 |
| 2007/0118752 | A1 * | 5/2007 | Kiessling | G06F 21/31 |
| | | | | 713/180 |
| 2008/0092227 | A1 * | 4/2008 | Eibach | H04L 63/08 |
| | | | | 726/12 |
| 2009/0172102 | A1 * | 7/2009 | Chesnutt | H04L 51/212 |
| | | | | 709/206 |
| 2009/0288175 | A1 * | 11/2009 | Sun | G06F 21/34 |
| | | | | 726/35 |
| 2010/0165878 | A1 * | 7/2010 | Soni | H04L 67/12 |
| | | | | 370/254 |
| 2011/0047630 | A1 * | 2/2011 | Cheng | H04L 9/3234 |
| | | | | 726/34 |
| 2011/0093639 | A1 * | 4/2011 | Richards | H04L 63/126 |
| | | | | 710/310 |
| 2013/0104231 | A1 * | 4/2013 | Niner | H04L 63/1416 |
| | | | | 726/23 |
| 2013/0219170 | A1 * | 8/2013 | Naitou | H04L 63/08 |
| | | | | 713/153 |
| 2013/0227650 | A1 * | 8/2013 | Miyake | H04L 67/12 |
| | | | | 726/3 |
| 2013/0316638 | A1 * | 11/2013 | Jang | H04K 3/42 |
| | | | | 455/1 |
| 2014/0040992 | A1 * | 2/2014 | Koide | H04L 63/0442 |
| | | | | 726/4 |
| 2014/0107875 | A1 * | 4/2014 | Beyer | B61L 15/0036 |
| | | | | 701/19 |
| 2014/0195808 | A1 * | 7/2014 | Lortz | H04L 63/0263 |
| | | | | 713/170 |
| 2015/0020152 | A1 * | 1/2015 | Litichever | H04L 63/08 |
| | | | | 726/1 |

FOREIGN PATENT DOCUMENTS

| | | | | |
|---|---|---|---|---|
| RU | 2250844 | C1 * | 4/2005 | |
| RU | 2 580 790 | | 4/2016 | |
| RU | 2580790 | C2 * | 4/2016 | ......... B61L 15/0036 |
| WO | WO-2020076197 | A1 * | 4/2020 | ........... G06F 21/552 |

OTHER PUBLICATIONS

Written Opinion of the ISA for PCT/RU2020/050051 dated Sep. 10, 2020, 4 pages.

* cited by examiner

SYSTEM AND METHOD FOR PROTECTING ELECTRONIC VEHICLE CONTROL SYSTEMS AGAINST HACKING

This application is the U.S. national phase of International Application No. PCT/RU2020/050051 filed Mar. 19, 2020 which designated the U.S. and claims priority to RU Patent Application No. 2019107755 filed Mar. 19, 2019, the entire contents of each of which are hereby incorporated by reference.

The present invention relates to the field of ensuring the safety of vehicles, namely, to the system and method of protecting electronic control systems of vehicles. The invention allows to identify and eliminate threats if necessary and inform the owner about them. The vehicle control protection system is a complex of software and hardware solutions.

In modern vehicles, the number of autonomous control systems is increasing every year. This circumstance is due to the emergence of new security systems, increase in comfort, improvement and digitalization of existing systems. Thus, today almost all the equipment of the vehicle is controlled by electronics: engine control system, brake control system, vehicle safety system, climate control system, etc.

Such a rapid development of automotive electronics is a broad foundation for the constant improvement of operating algorithms, the emergence of additional features, simplification/reduction of the cost of individual elements of the vehicle, etc. The analysis of the dynamics of digitalization of vehicle control systems shows a positive trend, and, consequently, progressive growth is expected in this area in the future.

However, there is also a serious drawback in the widespread use of such electronic control systems. Like any digital system, they have vulnerabilities, thereby they can be compromised. In case a control system is compromised, a hacker can gain partial or complete control over it. This can cause both material and physical damage to its owner and others.

Several variants of threats that allow a hacker to gain access to the vehicle's control systems:
Via external data carriers (USB flash drive, GSM module, Bluetooth module, Wi-Fi network, etc.);
Unauthorized installation of devices on the interface communication lines of the control system.

Thus, the present invention is aimed at ensuring the protection of electronic systems of vehicles from unauthorized intrusion.

The topological architecture of all control systems has a similar principle. Namely: there is usually a certain number of modules (devices) that are connected, and also exchange data over interface communication lines. The main goal of the hacker (in any case of threats) is an attack on the interface communication lines of control systems. The attack consists of spoofing, blocking, displaying hacker's data on the communication interface lines.

Today, control system protection measures are not implemented by vehicle manufacturers at the proper level or are being partially implemented. Therefore, the proposed method and system are in demand.

The existing complexes on the market that provide protection of vehicle control systems can be divided into two types:
providing protection at the software level;
hardware Firewall.

A security system is known from the state of the art, which is an addition to the Firmware of the electronic control unit (ECU) of the vehicle, designed to monitor network activity, analyze and eliminate attacks (see Argus development https://argus-sec.com/argus-ecu-protection/). Protection is provided at the software level by detecting attacks, suspicious activity and changes in the standard behavior of the car's network. The installed system in the vehicle is designed to monitor network activity, analyze and eliminate attacks.

The disadvantage of this solution is that the fact of a threat can be established only at the time of execution of the command. Also, this solution cannot be universal for any type and brand of vehicle, since adaptation is necessary.

The closest technical solution chosen as a prototype is a system and a method for ensuring the protection of electronic systems of vehicles described in U.S. Pat. No. 9,881,165B2, published on 30 Jan. 2018. The main component in such systems is the Firewall device. It is installed between the interface communication line of the control system and the ECU. The Firewall consists of the following functional blocks:
message receiving unit (monitoring of messages between the bus and the electronic control unit of the ECU);
message analysis block (determining the fact of unauthorized commands, based on the established rules);
the message transmission unit (forwarding legitimate commands to the electronic control unit of the ECU).

However, this type of system has similar disadvantages to the one described above. In such systems, the fact of unauthorized influence can be determined only at the time of issuing a malicious command. It is also necessary to adapt the system to each type of vehicle. In addition, one Firewall protects only one ECU.

The described types of existing options for the protection of vehicle control systems are not intended to determine the facts of the presence of unauthorized devices on the interface lines, replacement of standard ECUs, installation of new ones. Also, they do not provide protection in terms of detecting radio-receiving/transmitting devices in the security zone of the complex, as well as jamming in the selected radio band.

The essence of the present invention is to provide the most accurate result in determining and fixing unauthorized devices on the interface communication lines of vehicle control systems. The present invention, and, consequently, the system eliminates all the above disadvantages of existing systems:
the fact of installing an unauthorized device on the interface communication line can be determined before the control system is operating;
the invention allows to determine the fact of replacing existing devices on the interface lines of control systems;
the invention allows to determine the fact of installing new devices on the interface communication lines of control systems;
the invention does not require further work to improve the algorithms of operation;
the invention is universal for interface communication lines of any vehicle;
the invention can be installed on almost any type of interface communication lines used in control systems;
the invention provides detection and suppression of malicious commands issued via interface communication lines;
the invention provides detection of unauthorized radio transmitters in a given frequency range;
the invention allows to establish interference in a given frequency range;

the invention has a means of displaying and archiving information, settings.

The technical result of the present invention is to increase the safety and degree of protection of the vehicle from intrusions, by performing a comprehensive check and monitoring of the parameters of the vehicle control systems, as well as detecting unauthorized connected modules.

Figure 1:
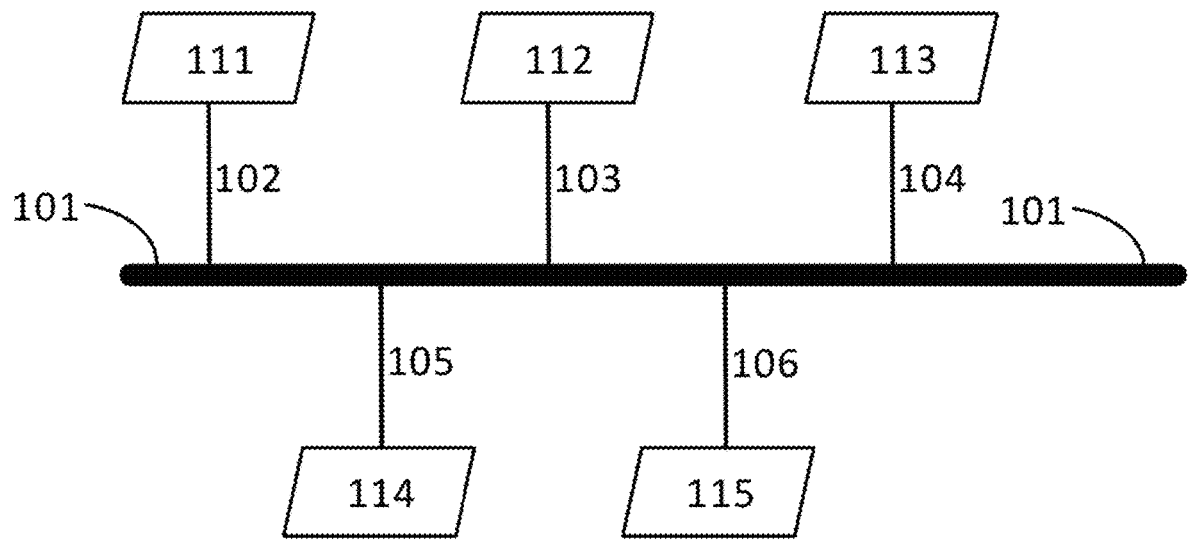
FIG. 1 shows a typical topology of the vehicle control system.

FIG. 1 shows a typical topology of a vehicle control system containing an interface communication line and the vehicle modules connected to it. The interface communication line 101 can be one of any existing interfaces (CAN, LIN, Ethernet, SAE J1708, SAE J1938, etc.). The number of electronic modules (devices) 111, 112, 113, 114, 115 in the system is not limited and can be counted in dozens. Any of the modules is connected to the interface communication line by a separate electrical wire 102, 103, 104, 105, 106. The exchange of information between electronic modules is carried out according to certain rules (digital protocols). There may be several control systems, as well as interface communication lines in the vehicle. And on each of the interface communication lines, data transmission can be implemented using a protocol/standard different from the others.

Figure 2:
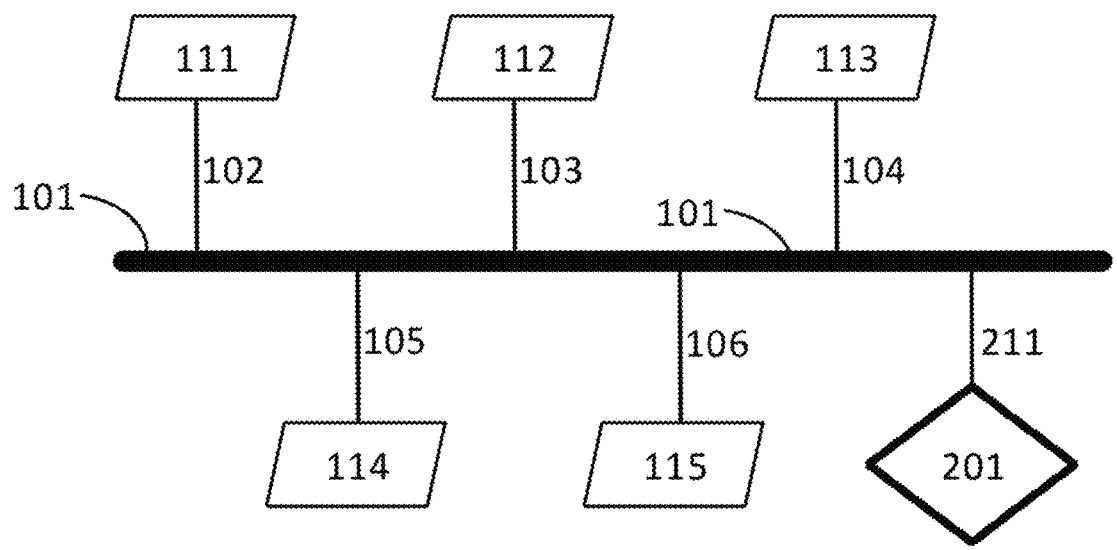
FIG. 2 illustrates a variant of the threat "Unauthorized installation of devices on the interface communication lines of the control system"

FIG. 2 shows a variant of the threat "Unauthorized installation of devices on the interface communication lines of the control system". The unauthorized device 201 is connected to the interface communication line 101 of the control system by means of connections 211. With this connection, the attacker has full access to the interface communication line and, accordingly, can control all the electronic modules of the vehicle.

Figure 3:
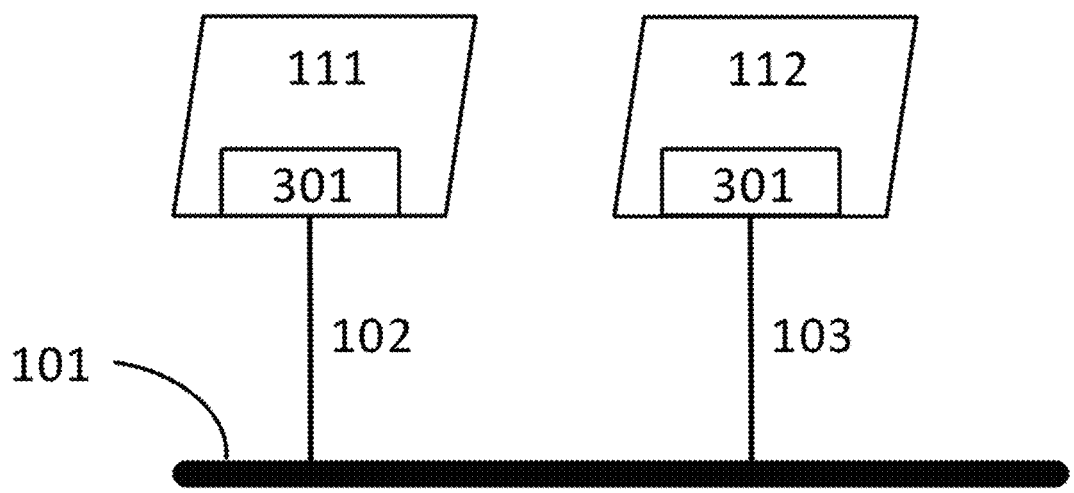
FIG. 3 shows a variant of the existing alternative system, made according to the principle of "Providing protection at the software level"

FIG. 3 shows a variant of the existing alternative system, made according to the principle of "Providing protection at the software level". Where in each module 111, 112 on the interface communication line 101, Firmware is supposed to be upgraded in terms of adding a software block 301, 302 that provides protection against unauthorized attacks.

Figure 4:
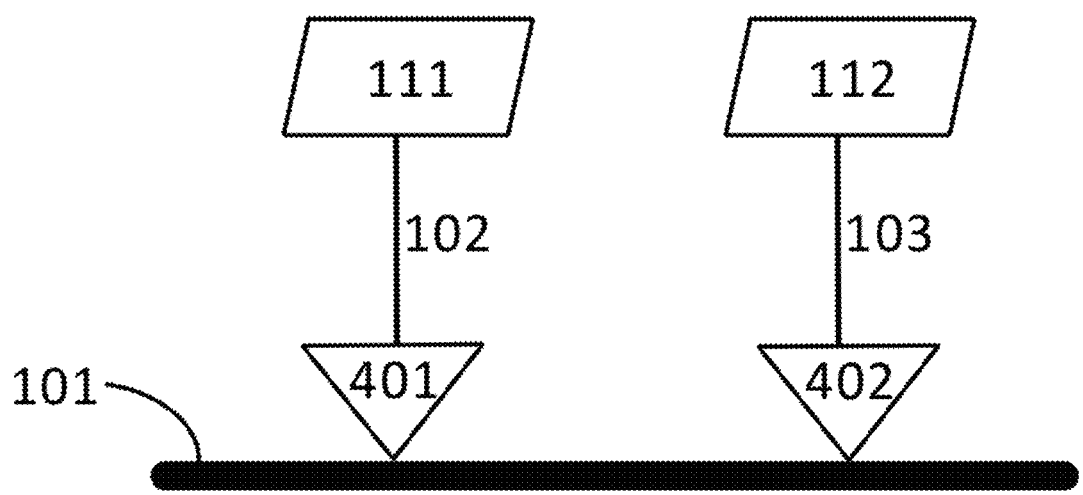
FIG. 4 shows a variant of the existing alternative system, made according to the principle of "hardware Firewall"

FIG. 4 shows a variant of the existing alternative system, made on the principle of "hardware Firewall". Communication of all modules 111, 112 with the interface communication line is performed through a separate device called Firewall 401, 402. To ensure full protection of the control system, it is necessary to provide the connection of each module through a separate Firewall device.

Figure 5:
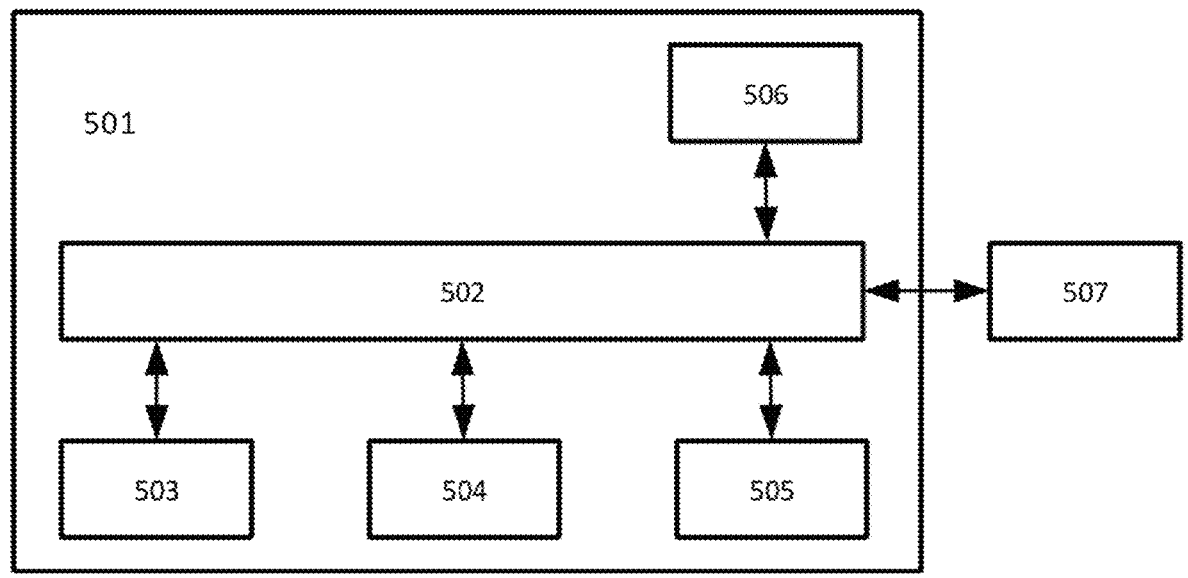
FIG. 5 shows the functional block diagram of the system implementing the method described in this application.

FIG. 5 shows a functional block diagram of a device that provides protection of vehicle control systems. The 501 device consists of 6 hardware and software blocks, each of them provides identification and suppression of threats by its own characteristics:

Unit 502 monitoring and control of vehicle parameters;
Unit 503 passive scanning of interface communication lines;
Unit 503 detection and suppression of malicious commands;
Unit 504 spectral analysis of interface communication lines;
Unit 505 detection/suppression of malicious commands
Unit 506 detecting and jamming in a given frequency range an unauthorized receiver/transmitter.
Unit 507 displaying information and entering configuration data.

Figure 6:
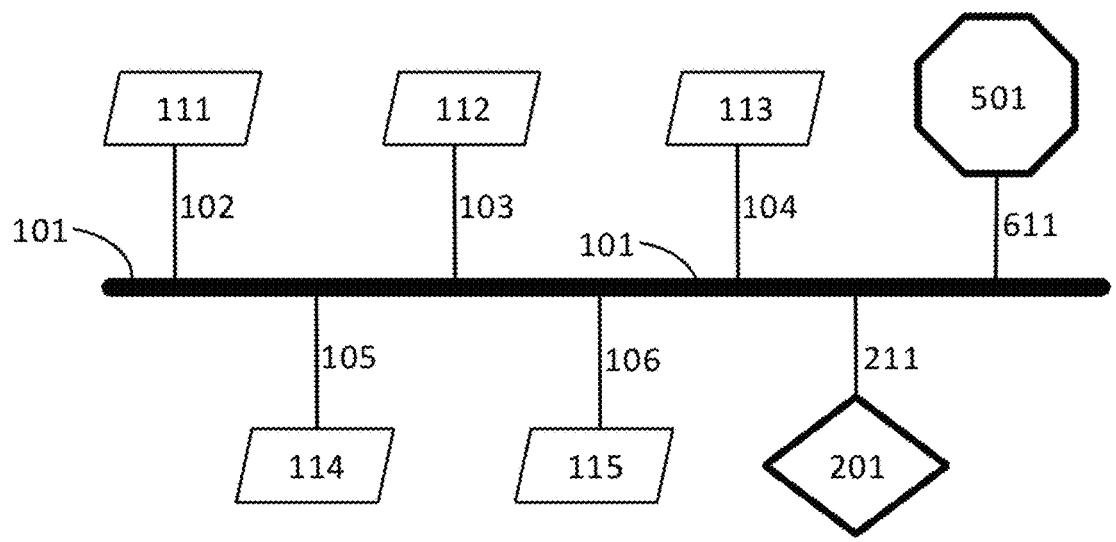
FIG. 6 shows the option of connecting the complex to the vehicle control system.

FIG. 6 shows the connection of the vehicle control system protection device 501 to the interface communication line 101 of the vehicle control system via an electrical conductor 611. The device can be connected to any type of interface communication line. As mentioned above, the system also contains at least one electronic module 111, 112, 113, 114, 115 of the vehicle connected via electrical conductors 102, 103, 104, 105, 106 to the interface communication line 101. If there is an unauthorized connected device 201, its actions are blocked according to the algorithms laid down in the device 501. Next, the units 502-507 that are part of the device 501 will be considered in detail.

Unit 502 (see FIG. 5) for monitoring and controlling vehicle parameters is part of the device 501 and is connected to the interface communication line 101 and is intended for transmitting configuration parameters to the executive units 503-507, organizing interaction between components, collecting information about connected modules, processing, archiving and transmitting data to the information display unit 507 and entering configuration data.

Unit 503 (see FIG. 5) of passive scanning of interface communication lines is part of the device 501 and is connected to the unit 502 for monitoring and controlling vehicle parameters and to the interface communication line 101 and implements a method for monitoring the electrical parameters of the interfaces of control systems of technical means for determining an unauthorized device. Monitoring of the electrical parameters of the interface communication lines involves measuring the resistive and capacitive components and comparing them with the "reference" value (which is set at the initial time when installing the system). Monitoring of electrical parameters is performed at the moment of the "rest" state.

The method is based on the fact that any additional device connected to the interface communication line 101 leads to a decrease in resistance and an increase in capacitance. Each transceiver connected to the interface communication line has a resistance R=50 kOhm, and a capacitive component of about 10 pF. This allows to detect an unauthorized device by increasing the total capacitance (the capacitance increases if an additional device is connected) and lowering the resistance (decreases if an additional device is connected).

Unit 504 (see FIG. 5) the spectral analysis of the interface communication line is part of the device 501 and is connected to the vehicle parameter monitoring and control unit 502 and to the interface communication line 101 and ensures the operation of the device 501 at the time of data exchange over the interface communication lines (in the "active" state). The principle of operation is based on the existing difference in the measured parameters of the spectrum constructed for different types and different number of devices on the interface line.

The unit digitizes the instantaneous values displayed on the interface communication line, and processes and calculates the spectrum. At the initial moment, a "reference" model of the spectrum is displayed, with respect to which the subsequent ones are compared. When replacing one of the units, adding a new one, etc., the new spectrum has differences from the "reference" one. This is a sign of an unauthorized intrusion into the control system.

For example, an increase in the reactance of the interface communication line or any other parameter of the vehicle leads to a distortion of the rectangular signal shape. This is due to the increasing influence of transition processes. The nature of the transition processes of any chain (in this case the interface line) depends on the integral differential properties of the reactive resistance component. The differential properties of the interface line lead to a distortion of the rectangular signal, adding peaks to it at the edges (positive—at the front, negative—at the back). The main influence on the differential properties of the electric bus is exerted by the capacitive component of the reactance.

Thus, the higher the capacitive component, the higher the amplitude of the peaks at the pulse fronts. Consequently, there is a direct relationship between the number of connected devices to the interface line of the vehicle control system and the form of the electrical signal during data transmission. Namely, the more connected devices there are, the higher the peak amplitude at the fronts. When replacing or replacing the electronic devices of the vehicle, the above parameters also change due to the heterogeneity of the characteristics of the driver chips.

Unit 505 (see FIG. 5) detection and suppression of malicious commands is part of the device 501 and is connected to the vehicle parameters monitoring and control unit 502 and to the interface communication line 101 provides blocking of commands that put at least one of the vehicle modules into service mode. Basically, the unit 505 monitors the commands transmitted to the vehicle control system. During the monitoring of the interface communication line, the unit 505 receives various data from the modules (111, 112, 113, 114, 115) connected to the interface communication line (for example: module identifiers, identifiers of transmitted parameters, parameter values, etc.). Various events can be used as parameters transmitted by the modules: the state of the central lock, the presence of a key inside the vehicle, the readings of the tachometer, speedometer, the temperature outside, in the cabin, etc. In order to block the input commands of one or more modules in the service mode, the communication line is forced to switch from the dominant state to the recessive state, thereby preventing the completion of the sequence.

When the complex increases the logical level on the interface communication line, a completely different command is issued. This method protects the vehicle, and does not allow the modules to enter the service mode. In other words, by forcibly changing the state of the interface line from active to passive, the overall command changes and does not work as intended by the attacker.

The mechanism of operation of this unit is defined by the following actions:
- a malicious sequence is detected that consists of three identical commands (a typical malicious sequence has at least three commands) that switch the unit (s) on the interface line to service mode.
  - For an example of modifying the third command for entering the service mode of the ABS/ESP unit in the Ford Mondeo MK4. The instructions for entering the module into service mode are as follows:
    02 00 08 35 FF 00 48 04 1A FC 43,
    04 00 08 FF FA 0A 86 BC 31 FF F0; a
    02 F0 08 0F F1 62 CE FB 40 F0 FF.
  - The resulting (modified) sequence of the module:
    02 00 08 35 FF 00 48 04 1A FC 43,
    04 00 08 FF FA 0A 86 BC 31 FF F0;
    02 F0 08 FF FF 62 CE FB 7F FF FF.
  - does not enter the service mode. The sequence leads to the shutdown of the ESP, which is not a critical phenomenon. The problem can be solved by pressing a button on the driver's remote control.
- when the third command is issued, the interface line is transferred to a recessive state, thereby the command is blocked. The third command is blocked because the first command is used in normal maintenance mode, but after detecting two suspicious commands in the line, the system knows that the third one should be blocked as malicious.
- the complex checks the status of the modules. If there are modules running in service mode, they are output from this mode.

The unit makes a report on the attack.

Additionally, this module is used to block any commands issued to the interface lines according to specified algorithms that are pre-determined, for example, disabling the brake system at the time of the car's movement, blocking the operation of the security system module during the car's movement, etc. These commands are initialized at the time of system configuration and adaptation, and are also stored in the memory of unit 502.

Unit 506 (see FIG. 5) for detecting and jamming in a given frequency range to an unauthorized receiver/transmitter identifies devices in a given range by the level of radio emissions at a certain frequency, as well as, if necessary, provides jamming. This unit is not intended for searching for unauthorized devices installed on the interface communication lines of control systems.

Modern digital communication protocols such as GSM, 3G, 4G, CDMA, etc. can be used for unauthorized tracking and transmission of information ("bugs", "wiretaps"). The main features of such protocols are:
1. A private encrypted channel that is difficult to be wiretapped by the receiver;
2. The possibility of using standard inexpensive equipment (routers, GSM modules, etc.);
3. Two-way data exchange allows to remotely control the "bug": turn it on and off, read data, make settings;
4. Operation in stealth mode—the ability to transmit data only on an external request, thus the difficulty of detection by radio signal;
5. Data transmission is carried out via cellular networks and the Internet, which means that it does not require a control post near the object;
6. The wide bandwidth allows to control both high-quality audio and transmit video from hidden video cameras.

Thus, the use of cellular communications for the organization of wiretapping is a very simple and tempting solution. In addition to listening to sound, the GSM/3G/4G mobile network can be used to monitor the location of the car using the built-in GPS tracker or by signals from base stations.

These factors make us very carefully study the presence of such signals on the object during a bug check (wiretapping).

The unit detects signals from radio sources, evaluates the power and frequency of the signal and forms signal-like interference at the frequencies of radio sources in automatic mode.

Thus, the block 506 provides protection against the following attacks
- Protection against wiretapping;
- Finding and jamming unauthorized receivers and transmitters.

Unlike conventional field detectors, this unit is designed not only for detecting sources by the electromagnetic field, but also for detecting various types of digital protocols, automated interference of various kinds. Unit's operation excludes triggering by various "interference" sources and it allows to perceive the "desired" signals at a greater distance.

The main advantages of the unit over existing field detectors searching for digital signals:
1) Higher detection sensitivity;
2) Selection of sources on the principle of friend-foe;
3) Extensibility of the radiation source database;
4) No false triggers;
5) The possibility of application for different communication standards in a wide frequency range from 70 to 6000 MHz.

The unit is able to search for and suppress the signals of receivers and transmitters in the area of its radiation, not only for the most common communication systems (GSM/3G/4G, BT, WiFi), but also for any unauthorized device that exchanges information at frequencies from 70 MHz to 6000 MHz.

Main technical characteristics:
- The operating frequency range of the receiving and transmitting path is from 70 MHz to 6000 MHz;
- Instant workband depending on the chosen hardware and software platform from 30 MHz to 100 MHz;
- The frequency resolution of the receiving device is not more than 20 kHz.
- The dynamic range of the receiver in single-signal mode is not less than 60 dB
- The time of scanning, analysis of the operating range and selection of IRI for radiation (the duration of the IRI detection stage) is not more than 500 microseconds
- Types of generated test signals: ASK, Noised FSK, 2FSK, 4FSK, 8FSK, BPSK, QPSK, 8QAM, 16QAM, 32QAM, 64QAM, 128QAM, 256QAM, 512QAM. The signal parameters can be set manually (for example, the duration of signal emission) or determined automatically (deviation, band, etc.).
- The power supply is provided from a battery with an output voltage (9-13 V).
- The radiation power is up to 2 watts.
- The main mode of operation for detecting unauthorized devices by the radiated field is monitoring, which provides detection at a given threshold of the signal with the preservation of information about it (time of occurrence, duration, level) for further processing.

Figure 7:
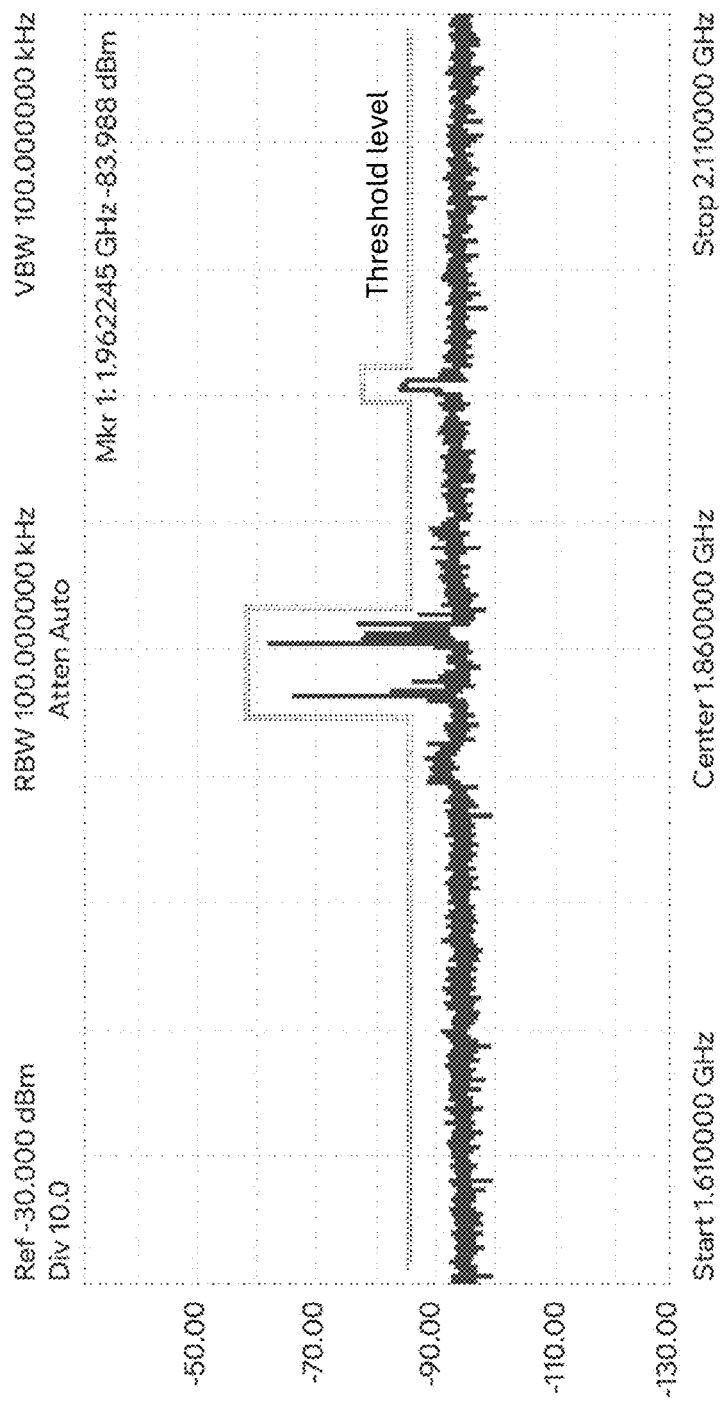
FIG. 7 shows a variant of applying a mask to a radio signal source.
Figure 8:
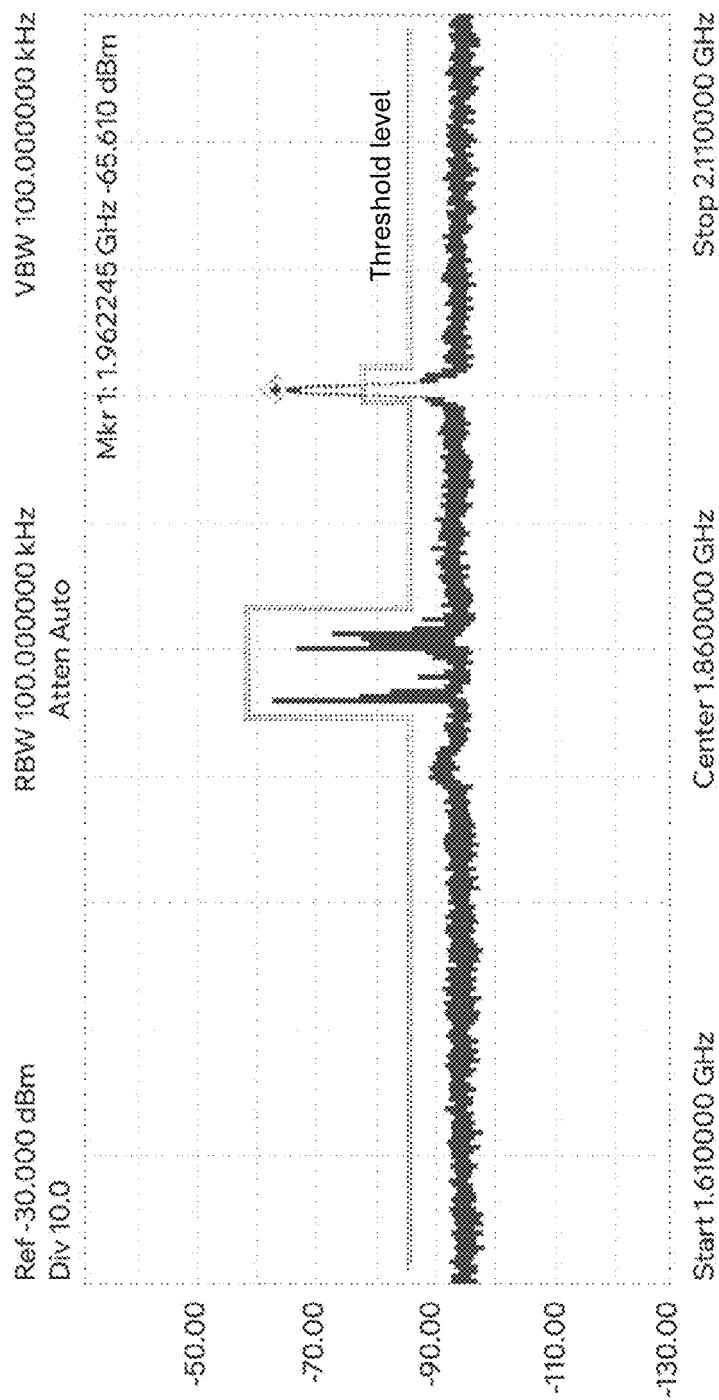
FIG. 8 shows a variant of detecting a data transmission channel using a mask.

FIGS. 7 and 8 show a method for detecting a data transmission channel over a 3G network based on detecting a field in the operating band of a cellular communication system transmitter.

The principle of operation is based on the following:
- the frequency band is scanned in the range of operation of a possible "wiretapping" transmitter via a cellular communication system channel;
- the mask is formed based on the results of monitoring of radio emission sources;
- the time, intensity and power of the radiation source are recorded for further identification; Additionally, there is a mode of operation in which not only the detection of sources by the electromagnetic field is performed, but also the detection of various types of digital protocols. Unit's operation excludes triggering by various "interference" sources and it allows to perceive the "desired" signals at a greater distance.

This mode of the unit's operation has the following advantages:
1. High detection sensitivity;
2. Selection of sources on the principle of friend-foe;
3. Extensibility of the radiation source database;
4. No false triggers;
5. The ability to use it with various communication standards (Wi-fi, Bluetooth, etc.).
6. The ability to detect not only the fact of the presence of a "bug", but also to determine its location.

Figure 9:
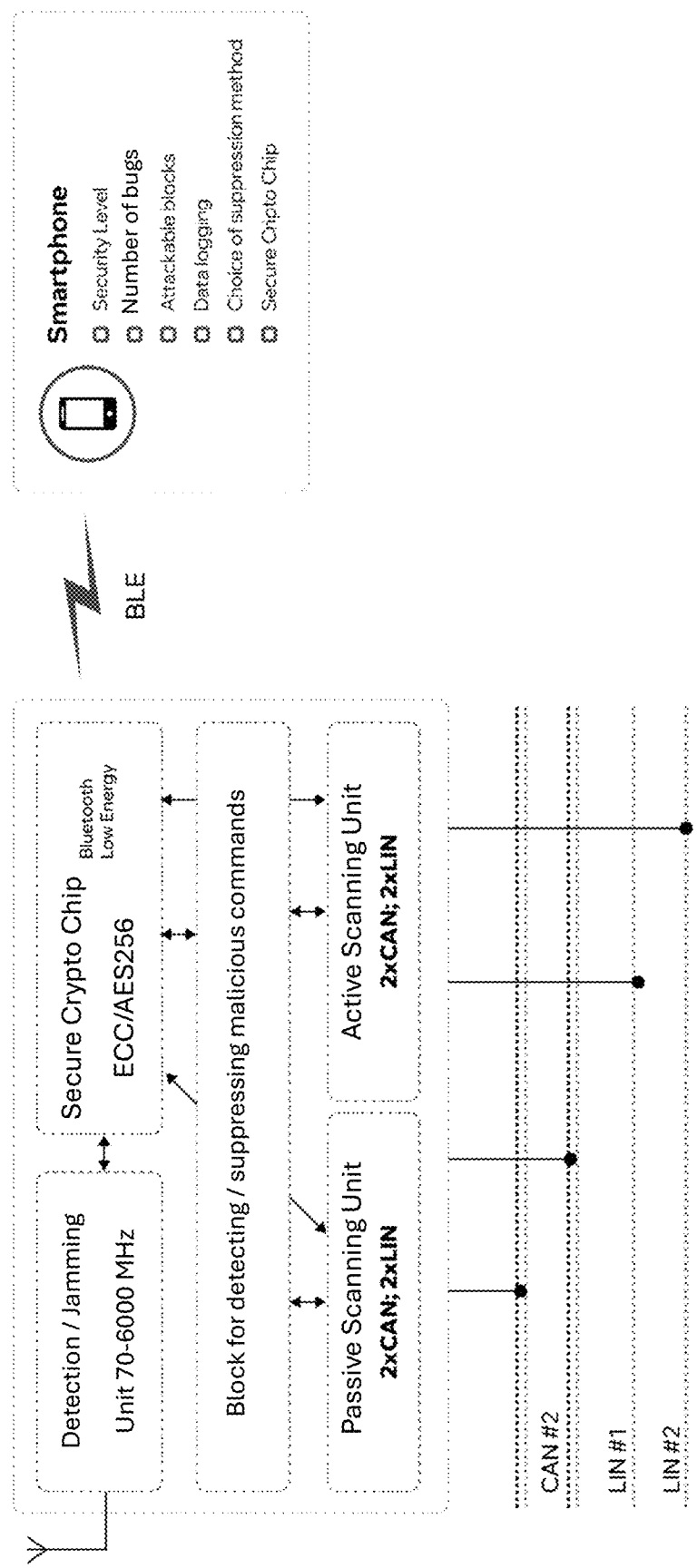
FIG. 9 shows a variant of using the complex for a vehicle with interface communication lines of CAN, LIN standards.

FIG. 9 shows the application of the system for a vehicle with CAN and LIN interface lines. The complex monitors two independent interface lines of the CAN and LIN standard. A smartphone acts as a block for displaying information and entering configuration data. Communication between the system and the smartphone is carried out via the Bluetooth Low Energy interface.

To protect the Bluetooth Low Energy communication channel, a secure crypto processor (Secure Crypto Chip) is used. The encryption of the communication channel is performed on the basis of ECC/AES256 algorithms.

Unit 507 (see FIG. 5) displays information and enters configuration data. It is the center of information collection and management in the system. Any mobile (portable) device can be such a center. The installed application provides complete information about the operation of the system, and also has the ability to configure and calibrate the system units.

The main function of the block 507 is to display information and enter configuration data:
- Providing information about the general level of security of the interface communication lines of the vehicle control systems;
- Displaying the detected hardware bugs;
- Displaying blocked malicious sequences;
- Detection of attacked vehicle blocks;
- Logging of control bus data;
- Detection and selection of the method of suppression of unauthorized receivers/transmitters.

It is also possible to receive information about events that occurred during the disconnection of the unit from the device 501.

The following is an example of a method for protecting the electronic systems of a vehicle from unauthorized intrusion.

Each interface communication line of a vehicle is characterized by a number of electrical parameters, such as reactance, active resistance, dominant and recessive bus voltage, average and maximum current consumption, bus speed, pulse duty cycle, etc. Each module of the vehicle, when connected to the interface communication line of the vehicle, makes changes to the electrical parameters.

The method for detecting connected unauthorized devices includes measuring the parameters of the electrical signal of the interface communication line in the first and second time intervals. The first time interval is considered to be the moment of buying a car, passing a technical inspection, or another set time point. The second time interval is any moment of time that is set by the user of the vehicle or after a certain time interval (one day, week, month) from the first time interval. Measurement of the parameters of the electrical signal of the interface line and monitoring of the transmitted communication commands is carried out by units 503-505. Next, the processed parameters are transferred to the unit 502 for their processing. After that, these parameters become available for other execution units 506-507. The parameters measured in the first time interval are "reference". Further, the parameters measured in the second time interval are subject to comparison with the "reference" ones.

The operation of the block 503 is based on the fact that each module connected to the interface communication line leads to a decrease in the active and an increase in the reactive component of the resistance. Using this property allows you to detect unauthorized connected devices. After measuring the parameters in the second time interval, a comparison is made with the parameters obtained in the first time interval. In this way, an unauthorized connected module is detected, since the parameters are changed.

The spectral analysis unit 504 measures the parameters of the electrical signals of the interface communication line 101 in the first and second time intervals, followed by the construction of the spectra of these signals. Then, to register the fact of unauthorized devices installed on the interface communication line, the obtained spectra are compared. When replacing one of the modules, adding a new one, etc., the new spectrum differs from the spectrum built in the first time period, which is a sign of an unauthorized intrusion into the vehicle control system.

The malicious command detection and suppression unit 505 is connected to the unit 502 and provides blocking of transmitted commands that put at least one of the vehicle modules into service mode by determining whether the data transmission is malicious or not. The list of malicious commands is initialized at the time of configuration and adaptation of the system, and is also stored in the memory of unit 502. If the block 505 detects a malicious unauthorized sequence consisting of three suspicious commands, the third command is blocked, which prevents the unit from switching to service mode.

The unit 506 for detecting and jamming in a given frequency range to an unauthorized receiver/transmitter is configured to operate in the frequency range from 70 to 6000 MHz before starting work. Thus, the subject of unit 506 is the majority of communication standards and various communication protocols, for example, GSM, 3G, 4G, CDMA, etc., which can be used for unauthorized tracking and transmission of information ("bugs", "wiretaps"). The unit 506 allows to detect signals from radio sources, with subsequent evaluation of the signal power and frequency, as well as detecting various types of communication protocols, followed by the formation of signal-like interference at the frequencies of radio sources in automatic mode, if necessary. During operation, the unit 506 can receive information from the unit 502 about previously detected receivers/transmitters, as well as about the frequency ranges and digital protocols through which they were connected.

All information about the operation of the units that are part of the vehicle control system protection device 501 can be shown in the information display unit 507 and the input of configuration data. Through this unit, it is also possible to configure or calibrate the operation of the device 501.

What is claimed is:

1. A system for protecting from unauthorized intrusion electronic control systems of a vehicle, the system comprising:
   an electrical conductor configured to connect to an interface communication line of the vehicle; and
   a controller, implemented in hardware and software, connected to the communication line of the vehicle via the electrical conductor, and configured to manage and control vehicle parameters transported to the vehicle by performing operations comprising:
   passively scanning the interface communication line while the interface communication line is in a "rest" state in which data is not exchanged thereon;
   spectrally analyzing signals from the interface communication line while the interface communication line is in an "active" state in which data is exchanged thereon;
   detecting and suppressing malicious commands; and
   detecting and jamming signals from an authorized transceiver in a specified frequency range.

2. The system according to claim 1, wherein the passive scanning comprises measuring an electrical parameter of the interface communication line.

3. The system according to claim 1, wherein the spectral analysis includes measuring an electrical signal and construction of a signal spectrum therefrom.

4. The system of claim 1, wherein the controller is further configured to generate a display including information about detected facts of unauthorized intrusion, and to receive entered configuration parameters.

5. The system according to claim 1, wherein the passive scanning comprises:
   measuring resistance and/or capacitance of the interface communication line;
   comparing the measured resistance and/or capacitance to a reference value; and
   determining that an unauthorized device has been connected to the interface communication line based on the comparison.

6. The system according to claim 5, wherein the reference value is set when the system is installed in the vehicle.

7. The system according to claim 1, wherein the spectral analysis comprises:
   digitizing a collection of instantaneous values placed on the interface communication line;
   calculating a spectrum from the digitized collection of instantaneous values;
   comparing the calculated spectrum to a reference model; and
   determining that an unauthorized device has been connected to the interface communication line based on the comparison.

8. The system according to claim 7, wherein different physical units connected to the interface communication line result in different spectra being calculated.

9. The system according to claim 1, wherein:
   the passive scanning comprises:
      measuring resistance and/or capacitance of the interface communication line; and
      determining that an unauthorized device has been connected to the interface communication line based on a first comparison between the measured resistance and/or capacitance, and a reference value; and
   the spectral analysis comprises:
      digitizing a collection of instantaneous values placed on the interface communication line;
      calculating a spectrum from the digitized collection of instantaneous values; and
      determining that an unauthorized device has been connected to the interface communication line based on a second comparison between the calculated spectrum and a reference model.

10. A method for protecting from unauthorized intrusion electronic control systems of a vehicle that includes electrical components connected to an interface communication line, the method comprising:

passively scanning the interface communication line while the interface communication line is in a "rest" state in which data is not exchanged thereon;

spectrally analyzing signals from the interface communication line while the interface communication line is in an "active" state in which data is exchanged thereon;

suppressing malicious commands detected as a result of the passive scanning and/or the spectral analyzing; and jamming signals from an authorized transceiver in a specified frequency range responsive to detection thereof.

11. The method according to claim 10, further comprising displaying information about detected facts of unauthorized intrusion and receiving entered configuration parameters.

12. The method according to claim 10, wherein the passive scanning comprises measuring an electrical parameter of the interface communication line.

13. The method according to claim 10, wherein the spectral analysis includes measuring an electrical signal and construction of a signal spectrum therefrom.

14. The method according to claim 10, wherein the passive scanning comprises:

measuring resistance and/or capacitance of the interface communication line;

comparing the measured resistance and/or capacitance to a reference value; and determining that an unauthorized device has been connected to the interface communication line based on the comparison.

15. The method according to claim 14, wherein the reference value is set when the system is installed in the vehicle.

16. The method according to claim 10, wherein the spectral analysis comprises:

digitizing a collection of instantaneous values placed on the interface communication line;

calculating a spectrum from the digitized collection of instantaneous values;

comparing the calculated spectrum to a reference model; and determining that an unauthorized device has been connected to the interface communication line based on the comparison.

17. The method according to claim 16, wherein different physical units connected to the interface communication line result in different spectra being calculated.

18. The method according to claim 10, wherein:

the passive scanning comprises:

measuring resistance and/or capacitance of the interface communication line; and determining that an unauthorized device has been connected to the interface communication line based on a first comparison between the measured resistance and/or capacitance, and a reference value; and the spectral analysis comprises:

digitizing a collection of instantaneous values placed on the interface communication line;

calculating a spectrum from the digitized collection of instantaneous values; and determining that an unauthorized device has been connected to the interface communication line based on a second comparison between the calculated spectrum and a reference model.

* * * * *